(12) United States Patent
Gokhfeld

(10) Patent No.: US 6,813,954 B2
(45) Date of Patent: Nov. 9, 2004

(54) HIGH SENSITIVITY PRESSURE SENSOR WITH LONG TERM STABILITY

(75) Inventor: Yuzef Gokhfeld, Waltham, MA (US)

(73) Assignee: Panametrics, Inc., Waltham, MA (US)

( * ) Notice: Subject to any disclaimer, the term of this patent is extended or adjusted under 35 U.S.C. 154(b) by 118 days.

(21) Appl. No.: 10/153,948

(22) Filed: May 23, 2002

(65) Prior Publication Data

US 2002/0174706 A1 Nov. 28, 2002

Related U.S. Application Data

(60) Provisional application No. 60/293,581, filed on May 25, 2001.

(51) Int. Cl.[7] .................................................. G01L 9/12
(52) U.S. Cl. ............................. 73/718; 73/724; 73/716
(58) Field of Search ........................... 73/718, 724, 716, 73/736; 361/283

(56) References Cited

U.S. PATENT DOCUMENTS

| | | | |
|---|---|---|---|
| 4,289,035 A | | 9/1981 | Lee |
| 4,459,856 A | | 7/1984 | Ko et al. |
| 4,475,402 A | | 10/1984 | Burkel et al. |
| 4,683,754 A | * | 8/1987 | Hirata et al. ................... 73/708 |
| 4,977,480 A | * | 12/1990 | Nishihara ................ 361/283.4 |
| 5,237,285 A | | 8/1993 | Lofgren et al. |
| 5,281,922 A | | 1/1994 | Lofgren et al. |
| 5,531,128 A | * | 7/1996 | Ryhanen ................. 73/862.623 |
| 5,992,240 A | * | 11/1999 | Tsuruoka et al. ............. 73/718 |
| 6,295,875 B1 | * | 10/2001 | Frick et al. .................... 73/718 |
| 6,568,274 B1 | * | 5/2003 | Lucas et al. ................... 73/718 |

* cited by examiner

Primary Examiner—Edward Lefkowitz
Assistant Examiner—Andre Allen
(74) Attorney, Agent, or Firm—Iandiorio & Teska

(57) ABSTRACT

A high sensitivity pressure sensor with long term stability including a housing with first and second chambers, a membrane separating the first and second chambers, a first electrode located in the first chamber and spaced from one side of the membrane forming a first capacitor therewith, and a second electrode located in the second chamber and spaced from an opposite side of the membrane forming a second capacitor therewith. A measuring circuit is connected across the first and second capacitors for measuring membrane displacement by detecting differences in capacitance between the first and second capacitors and a compensation circuit is configured to apply an electric field to the membrane as a compensating force by reducing the voltage difference between the first electrode and the membrane and simultaneously increasing the voltage difference between the second electrode and the membrane or vice versa to provide long term stability. The invention also features a unique compensation circuit for a pressure sensor and a method of making and operating a pressure sensor.

91 Claims, 4 Drawing Sheets

HIGH SENSITIVITY PRESSURE SENSOR WITH LONG TERM STABILITY

RELATED APPLICATIONS

This application claims priority of U.S. Provisional Application Ser. No. 60/293,581, filed May 25, 2001 entitled INSTRUMENT PRESSURE SENSOR (MICROPHONE).

FIELD OF THE INVENTION

This invention relates to a pressure sensor with long term stability and high sensitivity useful in various fields of instrumentation including gas analysis and Luft type infrared gas analyzers as well as in photoacoustic and magnetoacoustic analyzer systems.

BACKGROUND OF THE INVENTION

The task of measuring low levels of gas pressure with long term stability and high sensitivity is important in various field of instrumentation, particularly those related to gas analysis. Several classes of instrumentation rely on inducing small pressure changes in a gas sample by exposing the gas to a controlled stimulation or environment such as exposure to light, a magnetic field or an electric field stimulus. Luft type infrared gas analyzers as well as photoacoustic and magnetoacoustic analyzers, for example, rely on differential pressure measurements at frequencies that may, for example, range from a fraction of hertz to several kilohertz and with low pressure variations down to about $10^{-6}$ Pa (Pascal) detection thresholds. A pressure sensor capable of detecting such small pressure variations would be extremely useful in these environments. In general, there is a need to make dynamic pressure measurements within about plus or minus 1% accuracy over a long term (months to years), and in temperature ranges of up to several tens of degrees centigrade. In some situations, resistance to chemicals is also required.

By way of example, one specific application is a paramagnetic oxygen sensor. A sample of gas in a cell is subject to a time varying magnetic field that acts upon a paramagnetic component (e.g., oxygen) present in the gas to produce pressure variations that are to be detected by the pressure sensor. The time varying magnetic field produces pressure variations in the range of a fraction of a Hertz to 10 kHz. The amplitude of the signal output by the pressure sensor provides a measure of the oxygen concentration in the sample with typical pressure sensitivity of better then $10^{-5}$ Pa required for about 10±ppm oxygen sensitivity. Conventional pressure sensor designs, however, are poorly adapted to detect such low-amplitude pressure changes.

One common design for measuring pressure at near vacuum applications involves a diaphragm typically made of plastic under significant tension adhered to a ring to form a sealed differential pressure sensor assembly. However, the diaphragm tension change due to exposure to chemicals (vapors), thermal stresses in the housing, aging effects, and other sources of drift all have a great influence on the diaphragm displacement under pressure. A relatively significant tension of the membrane is required to reasonably offset these effects, which limits sensitivity. This is especially true when pressure variations down to about $10^{-6}$ Pa are to be measured. Moreover, in prior art designs, collateral variations in the sensor output necessitates frequent recalibrations or may require operation under elaborate temperature controls, signal offset, or other corrections.

SUMMARY OF THE INVENTION

It is therefore an object of this invention to provide a differential pressure sensor that is sufficiently sensitive to be used in measurement instruments such as sensitive gas analyzers and the like.

It is a further object of this invention to provide such a high sensitivity pressure sensor with long term stability.

It is a further object of this invention to provide an accurate differential pressure sensor with a high level of common-mode rejection at frequencies up to several kHz.

It is a further object of this invention to provide a pressure sensor which can be used for measuring low levels of gas pressure and thus useful in ppm range paramagnetic oxygen sensor and other implementations.

It is a further object of this invention to provide such a pressure sensor which is not sensitive to temperature changes or to the presence of corrosive chemical vapors as well as solvents, hydrocarbons, and the like.

It is a further object of this invention to provide such a pressure sensor which does not require frequent recalibrations.

It is a further object of this invention to provide such a pressure sensor which automatically compensates for variations due to slow effects such as dimensional or other (e.g., tensile) changes induced by temperature gradients.

This invention results from the realization that a more accurate, stable, and high sensitivity pressure sensor is effected by the inclusion of a compensation circuit configured to apply an electric field to the solid (e.g., metal), membrane of the sensor thereby creating a force to compensate for variations due to long-term or slow effects such as dimensional or tensile changes, by the use of a housing having a coefficient of thermal expansion the same as or similar to the coefficient of thermal expansion of the thin solid material membrane, and by the incorporation of a symmetrical design so that membrane displacement is associated linearly with voltage.

This invention features a high sensitivity pressure sensor with long term stability comprising a housing including first and second chambers, a membrane separating the first and second chambers, a first electrode located in the first chamber and spaced from one side of the membrane forming a first capacitor therewith, and a second electrode located in the second chamber and spaced from an opposite side of the membrane forming a second capacitor therewith. A measuring circuit is connected across the first and second capacitors for measuring membrane displacement by detecting differences in capacitance between the first and second capacitors and a compensation circuit is configured to apply an electric field to the membrane as a compensating force by reducing the voltage difference between the first electrode and the membrane and simultaneously increasing the voltage difference between the second electrode and the membrane or vice versa to provide long term stability.

Typically, the membrane is made of metal and the metal membrane is not under significant tension in the absence of a differential pressure between the two chambers. In the preferred embodiment, the tension on the membrane is less than 0.36 N/m. Also in the preferred embodiment, membrane displacement versus pressure due to the bending force of the membrane is $Y_{bend}$, the membrane displacement versus pressure due to tension is $Y_{tens}$, and $Y_{bend} \ll Y_{tens}$. Preferably, the housing is made of a material having a coefficient of thermal expansion the same as or substantially the same as the coefficient of thermal expansion of the material of the membrane, e.g., the housing is made of titanium and the membrane is made of titanium.

In one example, the housing includes first and second base plates each with an inner chamber and the membrane is disposed between the two base plates separating the inner chambers thereof and the two base plates are secured together under compression and then released to slightly tension the membrane to prevent negative tension thereof. The first electrode may be attached to a first holder affixed to the first base plate over its inner chamber and the second electrode is then attached to a second holder affixed to the second base plate over its inner chamber. Further included may be an insulator between the first holder and the first base plate and an insulator between the second holder and the second base plate. In a typical embodiment, a first seal is disposed about the first electrode sealing it with respect to the first base plate inner chamber and a second seal is disposed about the second electrode sealing it with respect to the second base plate inner chamber. The first base plate may include a conduit in communication with the inner chamber thereof and the second base plate then also includes a conduit in communication with the inner chamber thereof.

In the preferred embodiment, the membrane has a thickness of between 5–15 micrometers, the volume of the first chamber is substantially the same as or the same as the volume of the second chamber, and the spacing between the first electrode and the membrane is the same as or substantially the same as the spacing between the second electrode and the membrane. The spacing may be between 10 and 30 micrometers. Also, the first electrode typically has a substantially planar surface facing the membrane and the second electrode also has a substantially planar surface facing the membrane.

In the preferred embodiment, the compensation circuit includes a voltage divider connected to the first and second electrodes, and an amplifier connected to a middle point of the voltage divider for monitoring the electrical potential of the middle point. Also, the measuring circuit includes a bridge circuit connected to the first and second electrodes and having feedback to the compensation circuit. The bridge circuit may include a high frequency voltage source, namely the secondary coil of a transformer, the primary of which is connected to a high frequency voltage generator. The compensation circuit may further include a lock-in amplifier connected between the amplifier and the measuring circuit, the lock-in amplifier including a phase shifter connected to a high frequency voltage source and a phase detector connected to the amplifier. In one example, a low pass filter is disposed between the output of the phase detector and the amplifier.

An exemplary high sensitivity pressure sensor with long term stability in accordance with this invention features a housing including first and second chambers, a metal membrane separating the first and second chambers, the metal membrane not under significant tension in the absence of a differential pressure between the two chambers, a first electrode located in the first chamber and spaced from one side of the metal membrane forming a first capacitor, a second electrode located in the second chamber and spaced from an opposite side of the metal membrane forming a second capacitor, a measuring circuit for measuring membrane displacement by detecting differences in capacitance between the first and second capacitors, and a compensation circuit including a voltage divider connected to the first and second electrodes and having a middle point which when unbalanced applies a greater electrostatic field to one side of the membrane than the other side of the membrane.

An exemplary control circuit for a differential pressure sensor including first and second capacitors and a membrane common to both capacitors in accordance with this invention includes a measuring circuit connected across the first and second capacitors for measuring membrane displacement by detecting differences in capacitance between the first and second capacitors, and a compensation circuit configured to apply an electrostatic field to the membrane thereby producing a compensating force by reducing the voltage difference between the first electrode and the membrane and by simultaneously increasing the voltage difference between the second electrode and the membrane or vice versa to provide long term stability.

A method of making and using a high sensitivity pressure sensor with long term stability, in accordance with this invention, features forming a housing to include first and second chambers, disposing a membrane to separate the first and second chambers, placing a first electrode in the first chamber spaced from one side of the membrane forming a first capacitor therewith, placing a second electrode in the second chamber spaced from an opposite side of the membrane forming a second capacitor therewith, connecting a high frequency measuring circuit across the first and second capacitors for measuring dynamic membrane displacement by detecting differences in capacitance between the first and second capacitors, and applying an electrostatic field to the membrane generating a compensating force to reduce the voltage difference between the first electrode and the membrane and to simultaneously increase the voltage difference between the second electrode and the membrane or vice versa to provide long term stability.

A method of operating a high sensitivity pressure sensor to have long term stability in accordance with this invention includes measuring membrane displacement by detecting differences in capacitance between the first and second capacitors, and applying an electric field to the membrane as a compensating force by reducing the voltage difference between the first electrode and the membrane and by simultaneously increasing the voltage difference between the second electrode and the membrane or vice versa.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
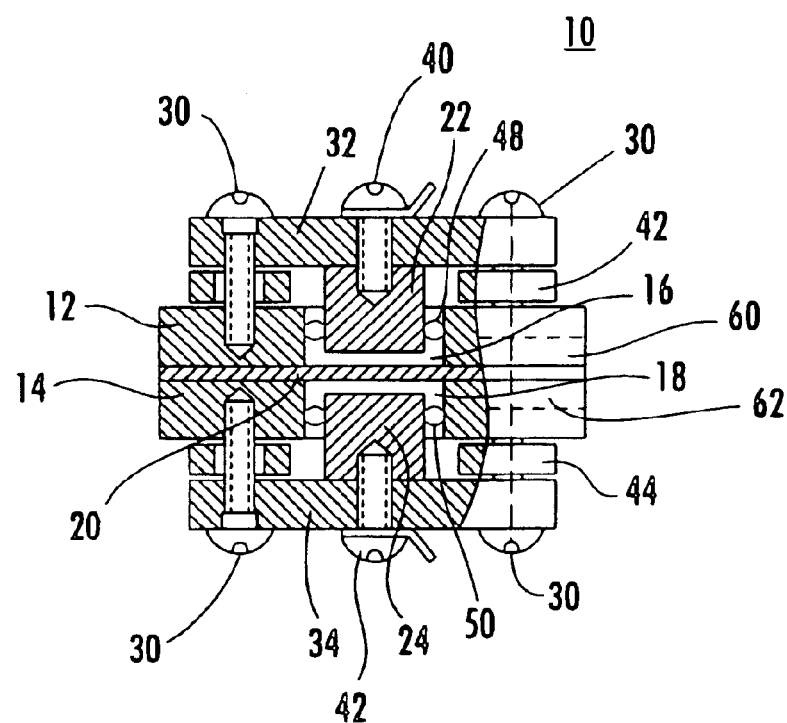
FIG. 1 is a schematic cross-sectional view showing the primary mechanical components associated with the pressure sensor associated with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 2:
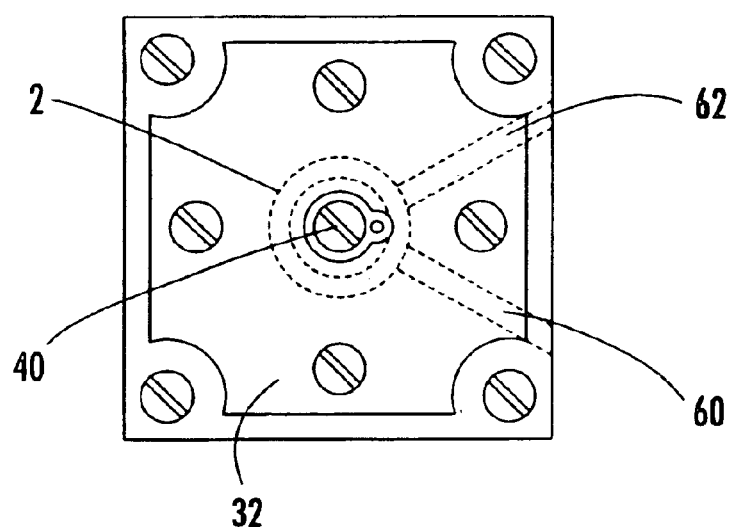
FIG. 2 is a top view of the pressure sensor shown in FIG. 1.

Pressure sensor 10, FIGS. 1–2 of this invention preferably includes a housing with two plates 12 and 14 defining first 16 and second 18 chambers of equal volume. Membrane 20 separates and spans chambers 16 and 18 and is clamped between plates 12 and 14. First electrode 22 is located in first chamber 16 and closely spaced to one side of membrane 20 forming a first capacitor therewith. Second electrode 24 is located in second chamber 18 and closely spaced to the other side of membrane 20 forming a second capacitor therewith.

Preferably, membrane 20 is made of metal such as titanium, stainless steel, or silicon or ceramic materials with a thickness of between 5–15 microns and is not under significant tension. Thus, the tension on membrane 20 is typically less than 0.36 N/m. The thickness of membrane 20 is chosen such that membrane displacement versus pressure due to the bending force of membrane 20 is $Y_{bend}$, and membrane displacement versus pressure due to tension is $Y_{tens}$. Preferably, $Y_{bend}$ is much less than $Y_{tens}$. In this invention, optimization of membrane 20 is based on the following formulas wherein the average membrane displacement versus pressure P due to a bending force is:

$$Y_{bend}=0.056*P*(R^4/E*h^3), \quad (1)$$

the average displacement versus pressure due to tension T is:

$$Y_{tens}=0.125*P*(R^2/T), \quad (2)$$

the tension versus temperature ($t-t_0$) due to temperature coefficient mismatch is:

$$T=T_0+\alpha*(t-t_0)*E*h, \quad (3)$$

and the sensitivity to pressure in terms of the displacement of the membrane is:

$$Y/P=[(Y_{bend}*Y_{tens})/(Y_{bend}+Y_{tens})]*(1/P). \quad (4)$$

R is the radius of membrane 20 spanning two chambers 16 and 18, E is the Young's Modulus, h is the thickness of membrane 20, t is the current temperature, $t_0$ is the reference temperature at which the tension T equals $T_0$ (reference tension), and $\alpha$ is the temperature coefficient difference (i.e., the mismatch) between membrane 20 and the material of plates 12 and 14. Typically, the value of R may range from ¹⁄₁₆ inch to ½ inch.

In order to increase displacement versus pressure sensitivity and reduce temperature error, $Y_{tens}$ should be maximized which means minimizing the tension T of the membrane within the whole working temperature range, for example between plus and minus 30° C. Tension T should not become negative (which means a compression force) resulting in membrane "popping." While the $Y_{bend}$ temperature coefficient is a very small fraction of a percent per degree Celsius, the $Y_{tens}$ temperature coefficient could be much greater: up to several percent per degree. For example, at R=4 mm, h=6 $\mu$m, E=$10^{11}$ Pa (and assuming titanium material), $\alpha$ is approximately $10^{-7}$ per ° C. or less (with all parts made of 99.9% pure titanium) and $(t-t_0)max=\pm 30°$ C., the optimal pre-stretch tension at $t=t_0$ is 0.18 N/m. The relevant $Y_{tens}$ (min) at 1 Pa is 11 $\mu$, which is about 17 times more than $Y_{bend}$=0.66 $\mu$Pa. Thus, in this example, the condition of $Y_{bend} \ll Y_{tens}$ is fulfilled.

Membrane 20 is fixed initially between plates 12 and 14 and slightly pre-stretched in order to avoid "popping" due to the temperature coefficient mismatch, i.e., to avoid membrane 20 from switching from being in tension to a compressed state as the dimensions of the pressure sensor housing change with temperature. Excessive tension is to be avoided as overstretching will result in loss of sensitivity and significantly increases temperature error as discussed above. $Y_{tens}$ is much more temperature dependent than $Y_{bend}$. This is the reason the tension is preferred to be positive yet as small as possible. In practice, the desired level of membrane stretching, usually as small as 0.2N/m, is achieved by compressing plates 12 and 14 during assembly of the pressure sensor while keeping the membrane loose. With a typical 1 cm² area of the lateral faces of plates 12 and 14, the required compressive force is only about 3N. The compressive force is applied centrally inward at the edge of plates 12 and 14 while membrane 20 loosely resides in thermal equilibrium between the plates. Plate screws 30 are then tightened to capture membrane 20 in an unstressed state between plates 12 and 14 and the compression is released. The rebound of plates 12 and 14 then precisely stretches membrane 20 by expanding plates 12 and 14.

As stated above, to reduce thermal mismatch induced errors, the material of plates 12 and 14 has a coefficient of thermal expansion the same as or substantially the same as the coefficient of thermal expansion of the material of membrane 20. In one example, all the metal component parts of the pressure sensor 10, FIG. 1 were made of 99.9% pure titanium. In other examples, titanium alloys are used. First holder 32 is affixed to base plate 12 over its inner chamber as shown and second holder 34 is also affixed to base plate 14 over its inner chamber. First electrode 22 is attached to first holder 32 via fastener 40 and second electrode 24 is attached to second holder 34 via fastener 42. Typically there is an electrical insulator as shown at 42 between holder 32 and base plate 12 and electrical insulator 44 is disposed between holder 34 and base plate 14. Seal 48 is disposed about electrode 22 sealing it with respect to the inner chamber of base plate 12 and a similar seal 50 seals second electrode 24 with respect to the inner chamber of base plate 14. Base plate 12 may include conduit 60 in communication with the inner chamber 16 thereof and then base plate 14 also includes conduit 62 in communication with the inner chamber 18 thereof. In the preferred symmetrical design, the spacing between first electrode 22 and membrane 20 is the same as or substantially the same as spacing between second electrode 24 and membrane 20. In one example the spacing was between 10–30 micrometers. Preferably, both electrodes have substantially planar surfaces facing the membrane.

In this way, diaphragm 20 is exposed on opposite sides thereof via conduits 60 and 62 to a pressure that is to be detected. Diaphragm 20 divides the housing into two subchambers 16 and 18 communicating via passages 60 and 62 with an unmodulated and a pressure modulated gas environment, respectively, thus forming a differential pressure sensor. But, metal diaphragm 20, rather than forming a tension membrane, is substantially unstressed as discussed above. Because the components of the pressure sensor of this invention are made of substantially identical material such that the thermal coefficients thereof are identical, the tension on membrane 20 does not vary when the temperature changes. The small level of pretension on membrane 20 is insufficient to exert tensile restoring forces or significant resistance to displacement. At the same time, the pretension does exceed the magnitude of any expected thermal tensile variation so membrane 20 does not switch states or pop when the temperature changes. Both plates 12 and 14 have a central hole and membrane 20 is firmly fixed between plates 12 and 14 suspended in the hollow opening of the two plates.

Capacitance electrodes 22 and 24 are typically mounted on holders 32 and 34 and rubber gaskets 48 and 50 pneumatically seal first and second chambers 16 and 18. Holders 32 and 34 are mounted on base plates 12 and 14 using dielectric spacers 42 and 44 and dielectric screws 30 thus electrically isolating electrodes 22 and 24 from membrane 20 and forming with membrane 20 the two capacitors. Channels or grooves 60 and 62 are formed in plates 12 and 14 and communicate at one end respectively, with chambers 16 and 18. Channels 60 and 62 allow for pneumatic (differential) gas pressure to be applied to membrane 20. They may, for example, be V shaped and positioned to conveniently be used as the sensor inlet. The other ends of conduits 60 and 62 may extend to respective (e.g., barbed) fittings or used for direct mounting on a manifold.

In the preferred embodiment, plates 12 and 14 and electrodes 22 and 24 are arranged to provide equal geometrical volumes on both sides of membrane 20 and these volumes as well as the pneumatic resistance of gas channels 60 and 62 are such that the pressure sensor is not vulnerable to alternating-back pressure change (common mode noise). In order to render the pressure sensor leak proof, the rim between plates 12 and 14 may be laser welded after assembly or, alternatively, a rubber gasket is used and placed in a peripheral slot (not shown).

Electrodes 22 and 24 are closely positioned to diaphragm 20 to provide electrostatic field induced forces as well as to provide capacitive sensing functions as discussed further below. For this purpose, the membrane-to-electrode gap is preferably precisely defined and well aligned. By way of example, a gap of 10–30 micrometers is suitable. Precision alignment is achieved by rigidly assembling each plate 12 or 14 of the body structure to its corresponding electrode structure 22, 24 and then by polishing the end face of the plate/electrode assembly to a common flat plane. The plates are then assembled together with the membrane placing a further 10–30 micrometer aperture conductive shim or gasket between each plate and the membrane to define the spacing between each plate and membrane 20 and hence the membrane-electrode gap.

Figure 3:
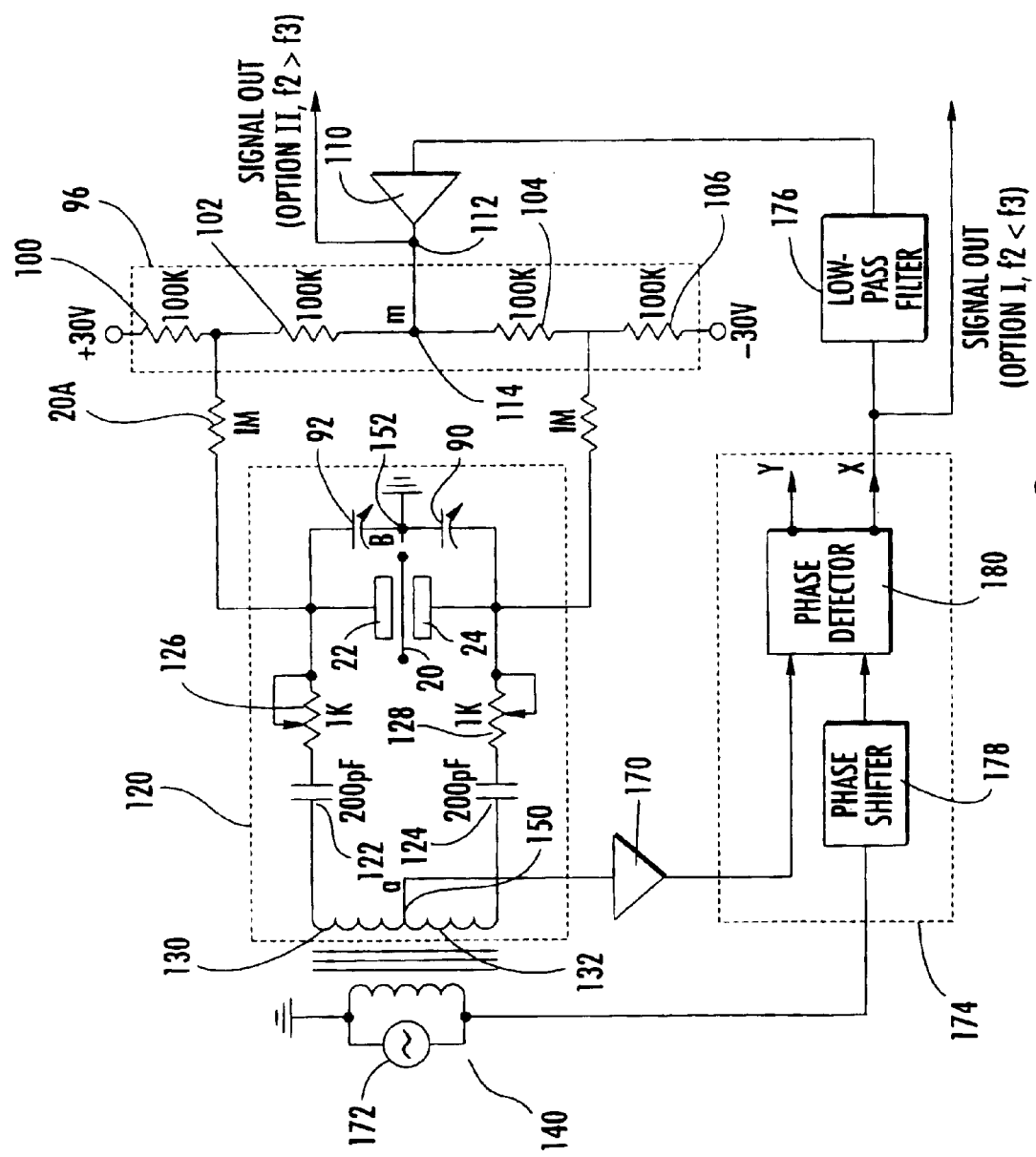
FIG. 3 is a schematic circuit diagram showing embodiments of the measuring circuit and the compensation circuit preferably associated with the pressure sensor of the subject invention.

FIG. 3 depicts one preferred electrical circuit useful in connection with the pressure sensor of this invention. The circuit fulfills two major tasks. One part of the circuit, the compensation circuit, is used to compensate for unwanted low frequency membrane displacement (zero drift) as a result of "aging" or temperature changes, for example. The same circuit may also compensate for any higher frequency differential force applied to membrane 20, for example the measured differential gas pressure or force of inertia resulting from vibration. In this invention, the compensation circuit is configured to apply an electric field to the membrane as a compensating force to reduce the voltage difference between electrode 22 and membrane 20 and to increase the voltage difference between electrode 24 and membrane 20 or vice versa. Thus, the position of diaphragm 20, FIG. 1 is controlled by electrostatic forces created by electrodes 22 and 24 closely positioned on opposite sides of membrane 20 such that electrodes 22 and 24 are impressed with a potential that moves membrane 20 to a null position and can compensate for variations due to slow effects such as dimensional or tensional changes using a low pass filtered feedback signal. By using band pass feedback, the circuit of FIG. 3 also generates a control signal directly representative of the sensed pressure.

Compensation is achieved by applying electric field "tension" as a compensating force to membrane 20. Because up to approximately $2 \times 10^6$ V/m electric field can be safely applied without sparking or electrical break-down, the resulting tension achievable with the electric field can be up to 30 Pascals. With a 0.66 $\mu$m/Pa average displacement sensitivity, an average distance between membrane 20 and capacitance electrodes 22 and 24 being on the order of about 30 $\mu$m, the dynamic reserve of the capacitance variation is large enough to compensate for temperature changes and practically all other sources of misbalance.

Thus, long term drift is compensated while dynamic pressures which are to be measured having frequencies ranging from a fraction of a Hertz to 10 kHz can be detected. The mean position of the diagram is centralized through the feedback circuit shown or an equivalent to provide long term stability and membrane displacement due to dynamic micropressures is measured by the measuring circuit described below.

The change in the capacitance measured (which is proportional to the acoustic pressure) can be only ~10–8 of the capacitance itself. Two ways to measure such a small change is to offset the "pedestal", usually by using a bridge or a low/high frequency filter. In the design of the subject invention, the bridge is used, working on radio frequency, e.g., 120 kHz. This approach is desired in the first place to beat the "thermal" noise limit, which is reversal proportional to the square of frequency (in filter-based design this frequency is simply the acoustic frequency measured, e.g., 10 Hz).

Every frequency ("low" or "high") should be referenced to the acoustic signal frequency measured (usually on fixed frequency dependent on application). 1 Hz to 10 kHz is appropriate. So-called carrier ("radio") frequency on the bridge could be anything from ~10 kHz to ~10 MHz, but always at least ~10 times higher than the (fixed) frequency of the pressure signal measured.

The high frequency bridge uses something non-traditional, namely lower frequency bridge compensation as well. In a broad dynamic range pressure of signal can become higher than maximum compensating pressure that can be practically achieved. To the contrary, at low end pressures, the bridge is kept as close to balance as possible. The main source of misbalance is temperature change and, especially, temperature gradient. Temperature-induced float of the bridge is relatively small and can be handled by feed-back pressure. Characteristic frequencies of temperature-induced float are small fraction of a Hertz, i.e., much less than minimal frequency in the range of measured acoustic frequencies. With the appropriately low cut-off frequency of low pass filter, only very low frequency ("thermal") misbalance will be compensated. In case the compensation forces are insufficient to fully compensate for misbalance, pressure is still measured with the unbalanced bridge.

As explained above, the compensating force is proportional to voltage, not voltage squared. Second, DC voltage is applied to the voltage divider, but not to the membrane. Ideally, this voltage is as high as possible but does not exceed the value, when the electric break-down between the membrane and the electrode can take place (as it is ~3 volt per micron in air, $2V/\mu$ will be safe). The frequency of compensating voltage on the membrane could be from the DC to cut-off frequency of the feed-back set (in theory it can be any, though it is not reasonable to compensate for too far above the fixed frequency of the acoustic signal (first option), or above a fraction of a Hertz (second option).

The capacitors formed by membrane 20 and electrodes 22 and 24 are shown in FIG. 3 connected in parallel with trimming capacitors 90, 92 but trimming capacitors 90, 92 are optional. The operation of the compensation circuit is as follows. A DC voltage from a voltage source (not shown) is applied to voltage divider 96 which includes resistors 100, 102, 104, and 106 which may each be 100 k ohms. Amplifier 110 is connected so that its output as shown at 112 monitors the electric potential of the middle point 114 of voltage divider 96. When point 114 is kept at zero (toward ground) potential, equal electric voltages (and hence electrostatic fields nearly equal in strength) are applied to both sides of membrane 20. As a result of these fields, opposing "tension" forces will practically cancel each other with close to zero net force applied to membrane 20. It can be shown that the $\Delta U$ voltage deviation from zero at point 114 applied from amplifier 110 will result in non-zero net force applied to membrane 20. With the described layout, this force direction and magnitude will depend on the sign and magnitude of voltage $\Delta U$. Thus, membrane displacement, in accordance with this invention, is associated linearly with voltage.

The other portion of the circuit of FIG. 3 is a measuring circuit connected across the capacitors formed by electrodes 22 and 24 and membrane 20. The job of the measuring circuit is to actually measure the dynamic displacement of membrane 20 relative to electrodes 22 and 24 due to dynamic pressure differences. As shown, the capacitors formed by membrane 20 and electrodes 22 and 24 are connected to bridge circuit 120 which includes optional trimming capacitors 92 and 90 especially for thicker membranes with lower pressure sensitivities, trimming resistors 126 and 128, and blocking capacitors 122 and 124 (which may, for example, be about 20 pF capacitors) and coils 130 and 132 of high frequency transformer 140. Capacitors 122 and 124 together with resistors 126 and 128 (having values of about 1 Mohm) are used primarily for "low" and "high" frequency voltage separation. The output signal of bridge 120 is measured between points 150 and 152. For practical reasons it is convenient but not necessary to have membrane 20 and hence plates 12 and 14 grounded as represented by point 152. Preamplifier 170 amplifies the normally small signal from bridge circuit 120. The other components shown in FIG. 3 include high 20 frequency voltage generator 172 (frequency $f_t$=120 kHz, 5 volt), 120 kHz lock-in amplifier 174 with phase shifter 178 and phase detector 180, and low pass filter 176 with a cut-off frequency $f_2$ as discussed below.

Figure 4:
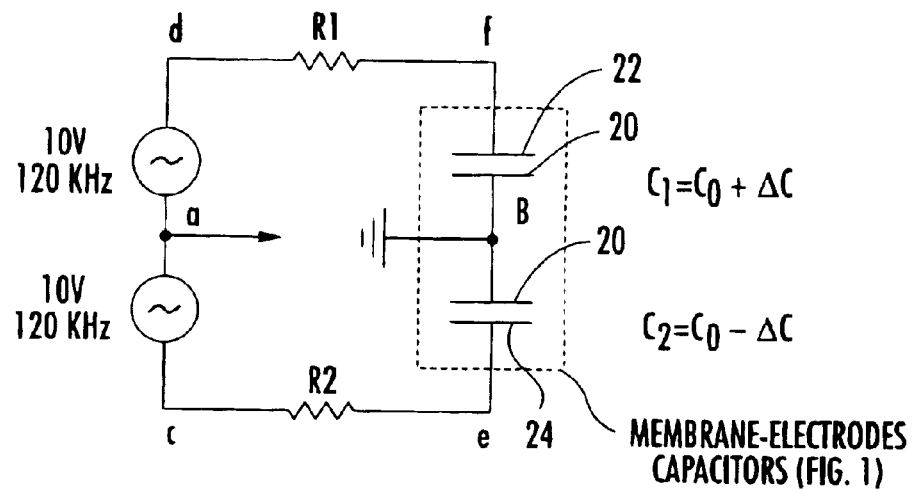
FIG. 4 is a circuit diagram representing an equivalent of the bridge circuit shown in FIG. 3.

FIG. 4 represents the equivalent circuit of bridge 120. In FIG. 4, $C_1$, $C_2$ are the capacitances between the membrane 20 and each of the electrodes 22 and 24; $C_0$ is the value of the capacitances $C_1$, $C_2$ with the membrane 20 positioned at mid-point between electrodes 22 and 24; and $\Delta C$ is the deviation from $C_0$ due to the membrane displacement.

Figure 5:
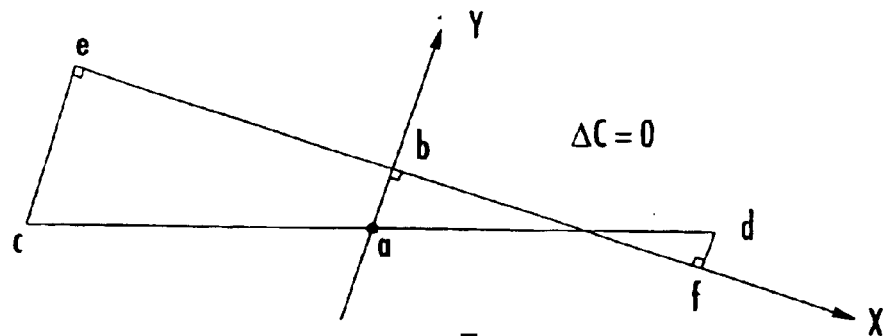
FIGS. 5–7 are vector diagrams illustrating the optimized phased relationship between the voltage in the bridge circuit of FIG. 4 at different positions of the membrane in relation to its capacitor forming electrodes.
Figure 6:
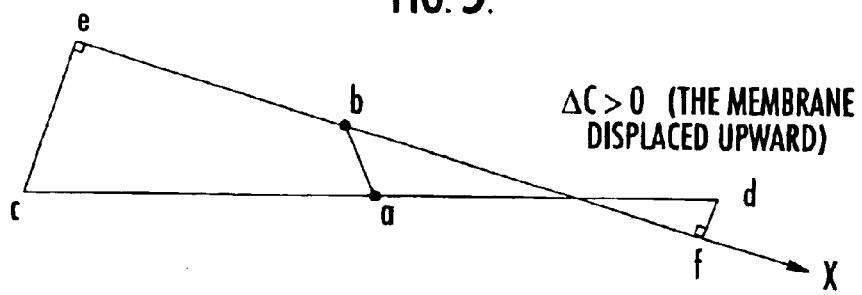
Figure 7:
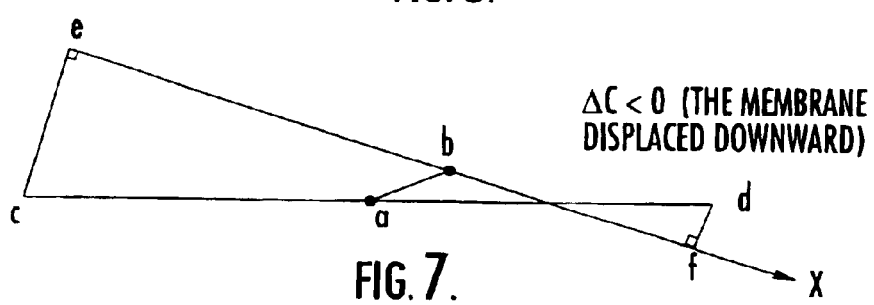

FIGS. 5–7 show vector diagrams illustrating the optimized relationship between voltages in the bridge circuit of FIG. 4 at different positions of the membrane 20 in relation to the electrodes 22 and 24. If the resistances are not equal, the voltage vector between points a and b is not zero as shown in FIG. 5. Vector X represents one of the outputs of phase detector 180.

By adjusting phase shifter 178, FIG. 3, the amplified output vector (ab) from the bridge is set to be perpendicular to vector X, FIG. 5 while keeping the length of Vector (ab) close to minimal. As the amplifier's output voltage is used as a signal of negative feedback, the feedback will then automatically keep the point B so that vector (ab) will stay perpendicular to vector X of FIG. 5, at least as average position. With coils 130 and 132, FIG. 3 and settings of the trimming capacitors 192 and 190 equal, the bridge will be balanced with the membrane 20 positioned essentially at the midpoint between electrodes 22 and 24.

In practice the vectors (c-e) and (d-f) are negligibly small compared with vectors (e-b) and (b-f) if the resistances are much less than:

$$1/(2\pi * f_1 * C_0) \qquad (5)$$

In this case the above set condition of (a-b) to be perpendicular to (e-f) is equivalent to 90° phase shift between voltage difference vectors in the opposite diagonals of the bridge, i.e., (a-b) and (c-d). A convenient condition to be used for initially adjusting trimming capacitors 90, 92 is the minimization of the voltage amplitude of the signal from preamplifier 170, e.g., using an osciloscope.

If the frequency of measured differential pressure is assumed to be a fixed frequency $f_3$, e.g. 20 Hz, the cut-off frequency of $f_2$ of low pass filter 178 can be set either below $f_3$ (e.g. $f_2$~1 Hz) or above $f_3$ (e.g., $f_2$~200 Hz). $f_2$ should be less than $f_1$. In the first case, a negative feedback signal supplied from filter 178 to amplifier 110 will compensate for only slow sources of misbalance such as temperature "drift" or "aging". The measured signal output from the pressure sensor is typically taken out of the X-output of lock-in amplifier 74. It will be zero at $C_1$=$C_2$=$C_0$ (FIG. 5) and will represent the capacitance change $\Delta C$ (FIGS. 6, 7). Furthermore, at relatively low levels of alternating pressures (e.g., a fraction of a Pascal) the sign and amplitude of $\Delta C$ is proportional to the direction and amplitude of the displacement of the membrane 20.

Another option is to set $f_2$>>$f_3$. In this case, the feedback will be fast enough to compensate for 20 Hz measurement signal as well. As a result, the X-channel output of lock-in amplifier 174 will become close to zero and vector (a-b) will stay perpendicular to vector X, as shown in FIG. 5. The amplified measurement signal now can be obtained on the compensating voltage output of the amplifier 110.

This second option has several advantages. The voltage and electric field applied (rather than the mechanical properties of membrane 20) will determine the "stiffness" of the membrane i.e., its response to pressure. Long-term stability of sensitivity to pressure can be substantially improved. Pneumatic analysis shows that the influence on sensitivity from gas viscosity in some practical applications can be diminished as well.

Figure 8:
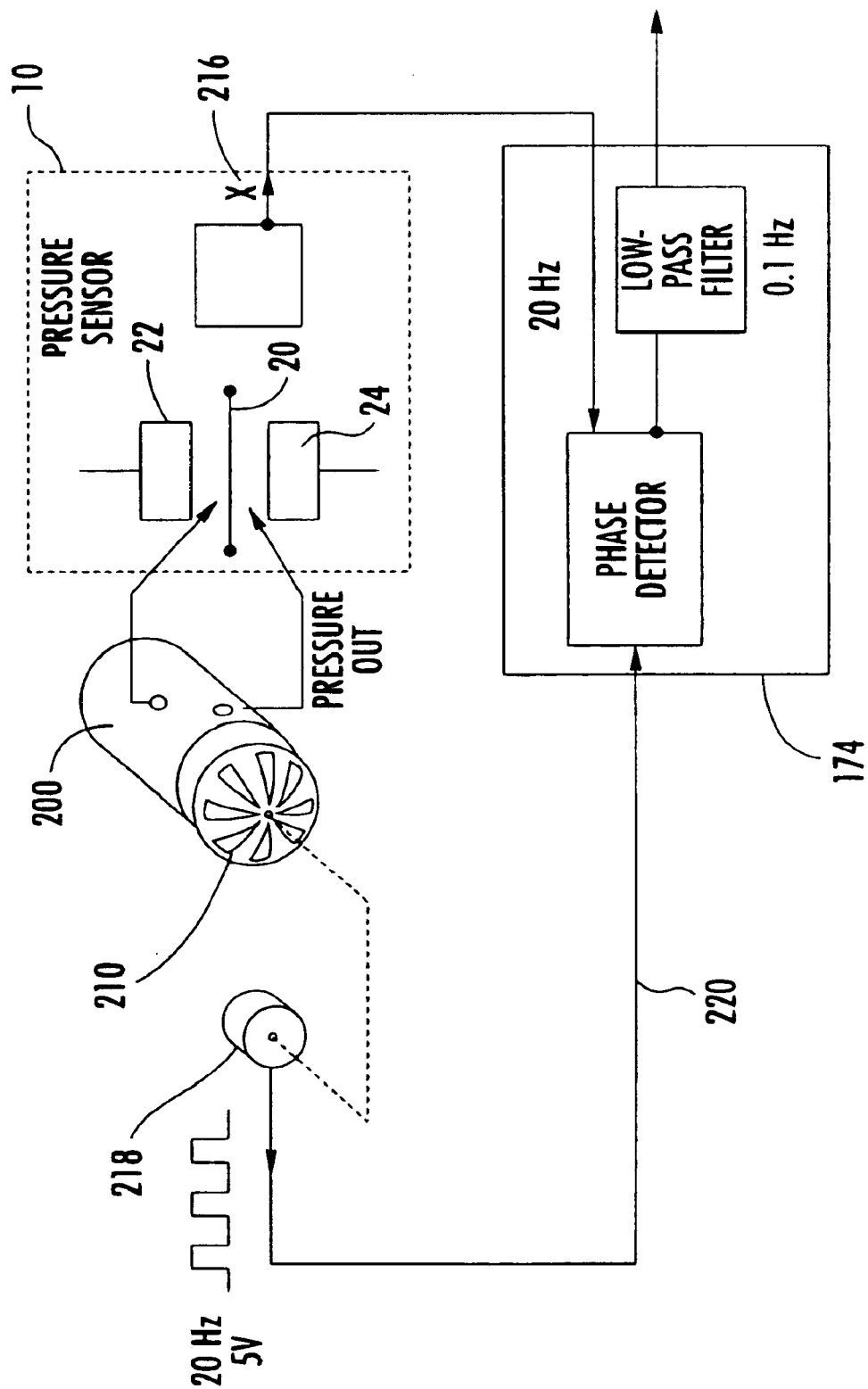
FIG. 8 is a schematic block diagram showing the primary components associated with a photoacoustic gas detector incorporating the pressure sensor of the subject invention.

FIG. 8 illustrates one of many possible instruments incorporating the pressure sensor of the present invention. Here pressure sensor 10 detects the pressure signal of photoacoustic gas detector. In this instrument, a gas sample in a chamber 200 is illuminated with a periodic stimulus, e.g., by the help of optical obturator 210 or a chopper or shutter assembly. For example, obturator 210 may apply a 20 Hz signal to the sample. Gas chamber 200, or relevant stimulated and non-stimulated regions thereof, communicate with the two sides of the membrane 20 of assembly 10, and the sensor system electronics discussed with reference to FIG. 3 provide an output signal x, as shown at 216. The frequency and phase of the optical obturator rotation are detected, e.g. by a shaft or other angular encoder mechanism 218 which provides a synchronization signal on line 220. The synchronization signal is applied to low frequency lock-in amplifier 174 that also receives the sensor signal x and thus substantially increases the achievable signal to noise ratio. For a lock-in averaging time of about ten seconds, signal discrimination down to a sensor pressure of about $10^{-6}$ Pa sensitivity can be achieved.

Thus, by employing a membrane imbalance signal with negative feedback to effect compensating membrane displacement using electric field forces from control electrodes 22 and 24, a sensitive instrument free of drift is obtained for operation at very low pressure fields. Various practical implementations of the bridge circuit with high frequency sampling of the imbalance can be employed with other circuitry known to those of ordinary skill in the art to provide enhanced sensors with enhanced stability, accuracy, or sensitivity or a combination of these factors. Further, the sensor of this invention is applicable to low level acoustic analysis in industrial instrumentation. The differential pressure sensor of this invention is not sensitive to common-mode back-pressure change by design. Vibration "noise" can be cancelled out e.g., by employing a second identical sensor with both sensors' inputs X-cross connected to the signal pressure.

The novel compensation circuit of this invention is configured to initially apply an electrostatic field of equal magnitude to both sides of the thin metal membrane of the sensor as a compensating force to compensate for variations due to slow effects such as dimensional or tensile changes. Preferably, to avoid temperature induced effects, the metal housing of the sensor shown in FIGS. 1–2 has a coefficient of thermal expansion the same as or similar to the coefficient of thermal expansion of the metal membrane. And, by the incorporation of a symmetrical design, membrane displacement is associated linearly with voltage.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A high sensitivity pressure sensor with long term stability comprising:

a housing including first and second chambers;

a membrane separating the first and second chambers;

a first electrode located in the first chamber and spaced from one side of the membrane forming a first capacitor therewith;

a second electrode located in the second chamber and spaced from an opposite side of the membrane forming a second capacitor therewith;

a measuring circuit connected across the first and second capacitors for measuring membrane displacement by detecting differences in capacitance between the first and second capacitors; and a compensation circuit configured to apply an electric field to the membrane as a compensating force and to reduce the voltage difference between the first electrode and the membrane and to increase the voltage difference between the second electrode and the membrane to provide long term stability.

2. The pressure sensor of claim 1 in which the membrane is made of metal.

3. The pressure sensor of claim 2 in which the metal membrane is not under significant tension in the absence of a differential pressure between the two chambers.

4. The pressure sensor of claim 3 in which the tension on the membrane is less then 0.36 N/m.

5. The pressure sensor of claim 3 in which the membrane displacement versus pressure due to the bending force of the membrane is $Y_{bend}$, the membrane displacement versus pressure due to tension is $Y_{tens}$, and $Y_{bend} \ll Y_{tens}$.

6. The pressure sensor of claim 1 in which the housing is made of a material having a coefficient of thermal expansion the same as or substantially the same as the coefficient of thermal expansion of the material of the membrane.

7. The pressure sensor of claim 6 in which the housing is made of titanium and the membrane is made of titanium.

8. The pressure sensor of claim 1 in which the housing includes first and second base plates each with an inner chamber and the membrane is disposed between the two base plates separating the inner chambers thereof.

9. The pressure sensor of claim 8 in which the two base plates are secured together under compression and then released to slightly tension the membrane to prevent negative tension thereof.

10. The pressure sensor of claim 8 in which the first electrode is attached to a first holder affixed to the first base plate over its inner chamber and the second electrode is attached to a second holder affixed to the second base plate over its inner chamber.

11. The pressure sensor of claim 10 further including an insulator between the first holder and the first base plate and an insulator between the second holder and the second base plate.

12. The pressure sensor of claim 10 further including a first seal about the first electrode sealing it with respect to the first base plate inner chamber and a second seal about the second electrode sealing it with respect to the second base plate inner chamber.

13. The pressure sensor of claim 8 in which the first base plate includes a conduit in communication with the inner chamber thereof and the second base plate includes a conduit in communication with the inner chamber thereof.

14. The pressure sensor of claim 1 in which the membrane has a thickness of between 5–15 micrometers.

15. The pressure sensor of claim 1 in which the volume of the first chamber is substantially the same as or the same as the volume of the second chamber.

16. The pressure sensor of claim 1 in which the spacing between the first electrode and the membrane is the same as or substantially the same as the spacing between the second electrode and the membrane.

17. The pressure sensor of claim 16 in which the said spacing is between 10–30 micrometers.

18. The pressure sensor of claim 1 in which the first electrode has a substantially planar surface facing the membrane and the second electrode has a substantially planar surface facing the membrane.

19. The pressure sensor of claim 1 in which the compensation circuit includes a voltage divider connected to the first and second electrodes, and an amplifier connected to a middle point of the voltage divider for monitoring the electrical potential of the middle point.

20. The pressure sensor of claim 1 in which the measuring circuit includes a bridge circuit connected to the first and second electrodes and having a feedback connected to the compensation circuit.

21. The pressure sensor of claim 20 in which the bridge circuit includes a high frequency voltage source.

22. The pressure sensor of claim 21 in which the high frequency voltage source is the secondary of a transformer, the primary of which is connected to a high frequency voltage generator.

23. The pressure sensor of claim 19 in which the compensation circuit further includes a lock-in amplifier connected between the amplifier and the measuring circuit.

24. The pressure sensor of claim 23 in which the lock-in amplifier includes a phase shifter connected to a high frequency voltage source and a phase detector connected to the amplifier.

25. The pressure sensor of claim 24 further including a low pass filter disposed between the output of the phase detector and the amplifier.

26. A high sensitivity pressure sensor with long term stability comprising:
- a housing including first and second chambers;
- a metal membrane separating the first and second chambers, the metal membrane not under significant tension in the absence of a differential pressure between the two chambers;
- a first electrode located in the first chamber and spaced from one side of the metal membrane forming a first capacitor,
- a second electrode located in the second chamber and spaced from an opposite side of the metal membrane forming a second capacitor;
- a measuring circuit for measuring membrane displacement by detecting differences in capacitance between the first and second capacitors; and
- a compensation circuit including a voltage divider connected to the first and second electrodes and having a middle point which when unbalanced applies a greater electric field to one side of the membrane than the other side of the membrane.

27. A high sensitivity pressure sensor with long term stability comprising:
- a housing including first and second chambers;
- a metal membrane separating the first and second chambers;
- a first electrode located in the first chamber and spaced from one side of the metal membrane forming a first capacitor;
- a second electrode located in the second chamber and spaced from an opposite side of the metal membrane forming a second capacitor,
- the housing made of a material having a coefficient of thermal expansion the same as or substantially the same as the coefficient of thermal expansion of the material of the membrane;
- a measuring circuit connected across the first and second capacitors for measuring membrane displacement by detecting differences in capacitance between the first and second capacitors; and
- a compensation circuit configured to apply an electric field to the membrane as a compensating force and to reduce the voltage difference between the first electrode and the membrane and to increase the voltage difference between the second electrode and the membrane.

28. A high sensitivity pressure sensor with long term stability comprising:
- a housing including first and second chambers;
- a metal membrane separating the first and second chambers;
- a first electrode located in the first chamber and spaced from one side of the metal membrane forming a first capacitor, and
- a second electrode located in the second chamber and spaced from an opposite side of the metal membrane forming a second capacitor,
- the metal membrane not under significant tension in the absence of a differential pressure between the two chambers.

29. The pressure sensor of claim 28 in which the tension on the membrane is less then 0.36 N/m.

30. The pressure sensor of claim 28 in which membrane displacement versus pressure due to the bending force of the membrane is $Y_{bend}$, membrane displacement versus pressure due to tension is $Y_{tens}$, and $Y_{bend} \ll Y_{tens}$.

31. The pressure sensor of claim 28 in which the housing is made of a material having a coefficient of thermal expansion the same as or substantially the same as the coefficient of thermal expansion of the material of the membrane.

32. The pressure sensor of claim 31 in which the housing is made of titanium and the membrane is made of titanium.

33. The pressure sensor of claim 28 in which the housing includes first and second base plates each with an inner chamber, the membrane disposed between the two base plates separating the inner chambers thereof.

34. The pressure of sensor of claim 33 in which the two base plates are secured together under compression and then released to slightly tension the membrane to prevent negative tension thereof.

35. The pressure sensor of claim 33 in which the first electrode is attached to a first holder affixed to the first base plate over its inner chamber and the second electrode is attached to a second holder affixed to the second base plate over its inner chamber.

36. The pressure sensor of claim 35 further including an insulator between the first holder and the first base plate and an insulator between the second holder and the second base plate.

37. The pressure sensor of claim 35 further including a first seal about the first electrode sealing it with respect to the first base plate inner chamber and a second seal about the second electrode sealing it with respect to the second base plate inner chamber.

38. The pressure sensor of claim 33 in which the first base plate includes a conduit in communication with the inner chamber thereof and the second base plate includes a conduit in communication with the inner chamber thereof.

39. The pressure sensor of claim 28 in which the membrane has a thickness of between 5–15 micrometers.

40. The pressure sensor of claim 28 in which the volume of the first chamber is substantially the same as or the same as the volume of the second chamber.

41. The pressure sensor of claim 28 in which the spacing between the first electrode and the membrane is the same as or substantially the same as the spacing between the second electrode and the membrane.

42. The pressure sensor of claim 41 in which the said spacing is between 10–30 micrometers.

43. The pressure sensor of claim 28 in which the first electrode has a substantially planar surface facing the membrane and the second electrode has a substantially planar surface facing the membrane.

44. The pressure sensor of claim 28 further including a controller comprising:
- a measuring circuit connected across the first and second capacitors for detecting differences in capacitance between the first and second capacitors; and
- a compensation circuit.

45. A high sensitivity pressure sensor with long term stability comprising:
- a housing including first and second chambers;
- a metal membrane separating the first and second chambers;
- a first electrode located in the first chamber and spaced from one side of the metal membrane forming a first capacitor;

a second electrode located in the second chamber and spaced from an opposite side of the metal membrane forming a second capacitor, the housing made of a material having a coefficient of thermal expansion the same as or substantially the same as the coefficient of thermal expansion of the material of the membrane; and a compensation circuit configured to apply an electric field to the metal membrane as a compensating force and to reduce the voltage difference between the first electrode and the metal membrane and to increase the voltage difference between the second electrode and the metal membrane to provide long term stability.

46. A control circuit for a differential pressure sensor including first and second capacitors and a membrane common to both capacitors, the control circuit comprising:

a measuring circuit connected across the first and second capacitors for measuring membrane displacement by detecting differences in capacitance between the first and second capacitors; and a compensation circuit configured to initially apply an equal voltage and electric field to both sides of the membrane, and apply a compensating force by reducing the voltage difference between the first electrode and the membrane simultaneously increasing the voltage difference between the second electrode and the membrane or vice versa to provide long term stability.

47. A method of making and using a high sensitivity pressure sensor with long term stability, the method comprising:

forming a housing to include first and second chambers;

disposing a membrane to separate the first and second chambers;

placing a first electrode in the first chamber spaced from one side of the membrane forming a first capacitor therewith;

placing a second electrode in the second chamber spaced from an opposite side of the membrane forming a second capacitor therewith;

connecting a measuring circuit across the first and second capacitors for measuring membrane displacement by detecting differences in capacitance between the first and second capacitors; and initially applying an equal strength electric field to each side of the membrane, and applying a compensating force by reducing the voltage difference between the first electrode and the membrane and simultaneously increasing the voltage difference between the second electrode and the membrane or vice versa to provide long term stability.

48. The method of claim 47 in which the membrane is made of metal.

49. The method of claim 48 in which the metal membrane is not under significant tension in the absence of a differential pressure between the two chambers.

50. The method of claim 49 in which the tension on the membrane is less then 0.36 N/m.

51. The method of claim 49 in which the membrane displacement versus pressure due to the bending force of the membrane is $Y_{bend}$, the membrane displacement versus pressure due to tension is $Y_{tens}$, and $Y_{bend} \ll Y_{tens}$.

52. The method of claim 47 in which the housing is made of a material having a coefficient of thermal expansion the same as or substantially the same as the coefficient of thermal expansion of the material of the membrane.

53. The method of claim 52 in which the housing is made of titanium and the membrane is made of titanium.

54. The method of claim 47 in which the housing includes first and second base plates each with an inner chamber and the membrane is disposed between the two base plates separating the inner chambers thereof.

55. The method of claim 54 in which the two base plates are secured together under compression and then released to slightly tension the membrane to prevent negative tension thereof.

56. The method of claim 55 in which the first electrode is attached to a first holder affixed to the first base plate over its inner chamber and the second electrode is attached to a second holder affixed to the second base plate over its inner chamber.

57. The method of claim 56 further including disposing an insulator between the first holder and the first base plate and disposing an insulator between the second holder and the second base plate.

58. The method of claim 56 further including disposing a first seal about the first electrode sealing it with respect to the first base plate inner chamber and disposing a second seal about the second electrode sealing it with respect to the second base plate inner chamber.

59. The method of claim 55 in which the first base plate includes a conduit in communication with the inner chamber thereof and the second base plate includes a conduit in communication with the inner chamber thereof.

60. The method of claim 47 in which the membrane has a thickness of between 5–15 micrometers.

61. The method of claim 47 in which the volume of the first chamber is substantially the same as or the same as the volume of the second chamber.

62. The method of claim 47 in which the spacing between the first electrode and the membrane is the same as or substantially the same as the spacing between the second electrode and the membrane.

63. The method of claim 62 in which the spacing is between 10–30 micrometers.

64. The method of claim 47 in which the first electrode has a substantially planar surface facing the membrane and the second electrode has a substantially planar surface facing the membrane.

65. The method of claim 47 in which the compensation circuit includes a voltage divider connected to the first and second electrodes, and an amplifier connected to a middle point of the voltage divider for monitoring the electrical potential of the middle point.

66. The method of claim 47 in which a bridge circuit is connected to the first and second electrodes and having a feedback connected to the compensation circuit.

67. The method of claim 66 in which the bridge circuit includes a high frequency voltage source.

68. The method of claim 62 in which the high frequency voltage source is the secondary of a transformer, the primary of which is connected to a high frequency voltage generator.

69. The method of claim 65 in which the compensation circuit further includes a lock-in amplifier connected between the amplifier and the measuring circuit.

70. The method of claim 69 in which the lock-in amplifier includes a phase shifter connected to a high frequency voltage source and a phase detector connected to the amplifier.

71. The method of claim 70 further including a low pass filter disposed between the output of the phase detector and the amplifier.

72. A method of operating a high sensitivity pressure sensor to have long term stability wherein the pressure sensor includes a housing with first and second chambers, a metal membrane separating the first and second chambers, a first electrode located in the first chamber and spaced from one side of the membrane forming a first capacitor, a second electrode located in the second chamber and spaced from an opposite side of the metal membrane forming a second capacitor, the method comprising:

measuring membrane displacement by detecting differences in capacitance between the first and second capacitors; and initially applying an electric field of equal magnitude to each side of the membrane, and applying a compensating force by reducing the voltage difference between the first electrode and the membrane and simultaneously increasing the voltage difference between the second electrode and the membrane or vice versa.

73. A high sensitivity pressure sensor with long term stability comprising:

a housing including first and second chambers;

a metal membrane separating the first and second chambers;

a first electrode located in the first chamber and spaced from one side of the metal membrane forming a first capacitor;

a second electrode located in the second chamber and spaced from an opposite side of the metal membrane forming a second capacitor, the metal membrane not under significant tension in the absence of a differential pressure between the two chambers; and a compensation circuit configured to apply an electric field to the metal membrane as a compensating force and to reduce the voltage difference between the first electrode and the metal membrane and to increase the voltage difference between the second electrode and the metal membrane to provide long term stability.

74. The pressure sensor of claim 73 in which the tension on the membrane is less then 0.36 N/m.

75. The pressure sensor of claim 73 in which membrane displacement versus pressure due to the bending force of the membrane is $Y_{bend}$, membrane displacement versus pressure due to tension is $Y_{tens}$, and $Y_{bend} << Y_{tens}$.

76. The pressure sensor of claim 73 in which the housing is made of a material having a coefficient of thermal expansion the same as or substantially the same as the coefficient of thermal expansion of the material of the membrane.

77. The pressure sensor of claim 76 in which the housing is made of titanium and the membrane is made of titanium.

78. The pressure sensor of claim 73 in which the housing includes first and second base plates each with an inner chamber, the membrane disposed between the two base plates separating the inner chambers thereof.

79. The pressure of sensor of claim 78 in which the two base plates are secured together under compression and then released to slightly tension the membrane to prevent negative tension thereof.

80. The pressure sensor of claim 78 in which the first electrode is attached to a first holder affixed to the first base plate over its inner chamber and the second electrode is attached to a second holder affixed to the second base plate over its inner chamber.

81. The pressure sensor of claim 80 further including an insulator between the first holder and the first base plate and an insulator between the second holder and the second base plate.

82. The pressure sensor of claim 80 further including a first seal about the first electrode sealing it with respect to the first base plate inner chamber and a second seal about the second electrode sealing it with respect to the second base plate inner chamber.

83. The pressure sensor of claim 78 in which the first base plate includes a conduit in communication with the inner chamber thereof and the second base plate includes a conduit in communication with the inner chamber thereof.

84. The pressure sensor of claim 73 in which the membrane has a thickness of between 5–15 micrometers.

85. The pressure sensor of claim 73 in which the volume of the first chamber is substantially the same as or the same as the volume of the second chamber.

86. The pressure sensor of claim 73 in which the spacing between the first electrode and the membrane is the same as or substantially the same as the spacing between the second electrode and the membrane.

87. The pressure sensor of claim 86 in which the said spacing is between 10–30 micrometers.

88. The pressure sensor of claim 73 in which the first electrode has a substantially planar surface facing the membrane and the second electrode has a substantially planar surface facing the membrane.

89. The pressure sensor of claim 73 further including a controller comprising:

a measuring circuit connected across the first and second capacitors for detecting differences in capacitance between the first and second capacitors.

90. A high sensitivity pressure sensor with long term stability comprising:

a housing including first and second chambers;

a metal membrane separating the first and second chambers;

a first electrode located in the first chamber and spaced from one side of the metal membrane forming a first capacitor, a second electrode located in the second chamber and spaced from an opposite side of the metal membrane forming a second capacitor, the metal membrane not under significant tension in the absence of a differential pressure between the two chambers; and a compensation circuit including a voltage divider connected to the first and second electrodes and having a middle point which when unbalanced applies a greater electric field to one side of the metal membrane than the other side of the metal membrane.

91. A high sensitivity pressure sensor with long term stability comprising:

a housing including first and second chambers;

a metal membrane separating the first and second chambers;

a first electrode located in the first chamber and spaced from one side of the metal membrane forming a first capacitor;

a second electrode located in the second chamber and spaced from an opposite side of the metal membrane forming a second capacitor, the housing made of a material having a coefficient of thermal expansion the same as or substantially the same as the coefficient of thermal expansion of the material of the membrane; and a compensation circuit including a voltage divider connected to the first and second electrodes and having a middle point which when unbalanced applies a greater electric field to one side of the metal membrane than the other side of the metal membrane.

* * * * *